United States Patent
Wong et al.

(10) Patent No.: US 6,720,021 B2
(45) Date of Patent: Apr. 13, 2004

(54) PROCESS FOR MAKING A LOW-FAT NUT SPREAD COMPOSITION

(75) Inventors: Vincent York-Leung Wong, Hamilton, OH (US); Richard Joseph Sackenheim, Hamilton, OH (US); James Earl Trout, West Chester, OH (US); Eugene Francisco Tavares, Fairfield, OH (US)

(73) Assignee: The Procter + Gamble Co., Cincinnati, OH (US)

( * ) Notice: Subject to any disclaimer, the term of this patent is extended or adjusted under 35 U.S.C. 154(b) by 336 days.

(21) Appl. No.: 09/982,712

(22) Filed: Oct. 18, 2001

(65) Prior Publication Data

US 2002/0106441 A1 Aug. 8, 2002

Related U.S. Application Data

(60) Provisional application No. 60/242,606, filed on Oct. 23, 2000.

(51) Int. Cl.⁷ .................................................. A23L 1/38
(52) U.S. Cl. ........................................................ 426/633
(58) Field of Search .................................. 426/615, 632, 426/633

(56) References Cited

U.S. PATENT DOCUMENTS

| | | |
|---|---|---|
| 1,395,934 A | 11/1921 | Stockton |
| 2,504,620 A | 4/1950 | Avera |
| 2,521,243 A | 9/1950 | Mitchell |
| 2,552,925 A | 5/1951 | Avera |
| 2,562,630 A | 7/1951 | Mitchell |
| 2,962,419 A | 11/1960 | Minich |
| 3,085,939 A | 4/1963 | Wruble et al. |
| 3,192,102 A | 6/1965 | Nolan |
| 3,265,507 A | 8/1966 | Japikse |
| 3,541,009 A | 11/1970 | Arendt et al. |
| 3,579,548 A | 5/1971 | Whyte |
| 3,597,230 A | 8/1971 | Colby et al. |
| 3,600,186 A | 8/1971 | Mattson et al. |
| 3,615,675 A | 10/1971 | Wisdom et al. |
| 3,751,569 A | 8/1973 | Erickson |
| 3,865,939 A | 2/1975 | Jandacek |
| 3,917,863 A | 11/1975 | Kaufman, Jr. et al. |
| 3,932,532 A | 1/1976 | Hunter et al. |
| 4,005,195 A | 1/1977 | Jandacek |
| 4,005,196 A | 1/1977 | Jandacek et al. |
| 4,251,201 A | 2/1981 | Krysiak |
| 4,259,051 A | 3/1981 | Shatila |
| 4,275,647 A | 6/1981 | Chambers et al. |
| 4,341,814 A | 7/1982 | McCoy |
| 4,377,438 A | 3/1983 | Moriya et al. |
| 4,482,575 A | 11/1984 | Olds |
| 4,508,746 A | 4/1985 | Hamm |
| 4,582,927 A | 4/1986 | Fulcher |
| 4,587,128 A | 5/1986 | Cummings |
| 4,661,360 A | 4/1987 | Smith |
| 4,774,095 A | 9/1988 | Kleinschmidt et al. |
| 4,794,009 A | 12/1988 | Dreisin |
| 4,808,422 A | 2/1989 | Ward et al. |
| 4,840,815 A | 6/1989 | Meyer et al. |
| 4,861,613 A | 8/1989 | White et al. |
| 4,863,753 A | 9/1989 | Hunter et al. |
| 4,865,859 A | 9/1989 | Porcello et al. |
| 4,880,653 A | 11/1989 | Keller et al. |
| 4,882,185 A | 11/1989 | Simelunas et al. |
| 4,888,195 A | 12/1989 | Huhn et al. |
| 4,959,466 A | 9/1990 | White |
| 5,041,541 A | 8/1991 | Mazur |
| 5,071,669 A | 12/1991 | Seiden |
| 5,077,073 A | 12/1991 | Ennis et al. |
| 5,079,027 A | 1/1992 | Wong et al. |
| 5,085,884 A | 2/1992 | Young et al. |
| 5,139,807 A | 8/1992 | Klemann et al. |
| 5,158,796 A | 10/1992 | Bernhardt et al. |
| 5,159,443 A | 10/1992 | Ando |
| 5,194,281 A | 3/1993 | Johnston et al. |
| 5,230,919 A | 7/1993 | Walling et al. |
| 5,244,887 A | 9/1993 | Straub |
| 5,268,192 A | 12/1993 | Zook et al. |
| 5,273,772 A | 12/1993 | Cooper |
| 5,288,512 A | 2/1994 | Seiden |
| 5,308,634 A | 5/1994 | Cooper |
| 5,374,438 A | 12/1994 | Yost |
| 5,374,446 A | 12/1994 | Ferenz et al. |
| 5,389,392 A | 2/1995 | Cooper |
| 5,399,371 A | 3/1995 | Harris |
| 5,399,729 A | 3/1995 | Cooper et al. |
| 5,419,925 A | 5/1995 | Seiden et al. |
| 5,422,131 A | 6/1995 | Elsen et al. |
| 5,427,815 A | 6/1995 | Ferenz |
| 5,433,970 A | 7/1995 | Wong et al. |
| 5,451,416 A | 9/1995 | Johnston et al. |
| 5,480,667 A | 1/1996 | Corrigan et al. |

(List continued on next page.)

FOREIGN PATENT DOCUMENTS

| | | |
|---|---|---|
| WO | WO 98/41099 A1 | 9/1998 |
| WO | WO 01/72146 A2 | 10/2001 |

*Primary Examiner*—Keith Hendricks
(74) *Attorney, Agent, or Firm*—Melody A. Jones

(57) ABSTRACT

A low-fat and low-calorie nut spread having at least about 50% less fat and at least about 33% fewer calories than full-fat peanut butter yet having a flavor and texture comparable to a full-fat nut butter or spread. The nut spread has a non-fat solids to oil ratio that is less than about 2.0:1, comprises nut solids that have a mono-modal particle size distribution where the $D_{50}$ and $D_{90}$ sizes are less than about 15 and about 30 microns, respectively. The level of fat-free nut solids is from about 34% to about 45%. The apparent viscosity of the nut spread is less than about 4500 cP. The nut spread comprises at least about 20% oil substitute, preferably a sucrose polyester that contains an anal leakage controlling agent. Also disclosed is a preferred process for making the nut spread.

7 Claims, No Drawings

U.S. PATENT DOCUMENTS

| | | |
|---|---|---|
| 5,490,995 A | 2/1996 | Corrigan |
| 5,490,999 A | 2/1996 | Villagran et al. |
| 5,502,045 A | 3/1996 | Miettinen et al. |
| 5,508,057 A | 4/1996 | Wong et al. |
| 5,518,755 A | 5/1996 | Wong et al. |
| 5,536,524 A | 7/1996 | Miller |
| 5,589,217 A | 12/1996 | Mazurek |
| 5,597,605 A | 1/1997 | Mazurek |
| 5,667,838 A | 9/1997 | Wong et al. |
| 5,693,357 A | 12/1997 | Wong et al. |
| 5,709,209 A | 1/1998 | Friemel et al. |
| 5,714,193 A | 2/1998 | Fix et al. |
| 5,885,645 A | 3/1999 | Wong et al. |
| 5,935,633 A | 8/1999 | Derian |
| 5,942,275 A | 8/1999 | Wong et al. |
| 5,958,913 A | 9/1999 | Miettenen et al. |
| 6,010,737 A | 1/2000 | Meade |
| 6,312,754 B1 | 11/2001 | Wong |
| 6,548,103 B2 * | 4/2003 | Wong et al. ................ 426/633 |
| 2002/0015761 A1 | 2/2002 | Prosise et al. |

* cited by examiner

PROCESS FOR MAKING A LOW-FAT NUT SPREAD COMPOSITION

CROSS REFERENCE TO RELATED APPLICATIONS

This application claims the benefit of priority to U.S. Provisional Application Ser. No. 60/242,606, filed Oct. 23, 2000, which is herein incorporated by reference.

TECHNICAL FIELD

The invention relates to nut spreads having reduced fat and calories and the process for making the same. More particularly, it relates to low-viscosity peanut spreads employing nut solids with mono-modal particle size distribution and non-digestible fat. Nut spreads made with these compositions have a flavor and texture comparable to full-fat nut spreads.

BACKGROUND OF THE INVENTION

Conventional peanut and other nut butters or spreads consist of a mixture of solid nut particles, liquid oil, flavorants (e.g., a sweetener such as sugar, high fructose corn syrup or honey, and salt), and a stabilizer. Peanut butters typically contain about 50% oil and about 50% solids. Peanut butters are nutritious but are high in fat and calories. Thus, it would be desirable to produce a peanut butter or spread product that has a reduced level of fat and calories.

Significantly increasing the solids to oil ratio is one means used in the past to lower the fat content of peanut spreads. Increasing solids to oil ratio is often achieved by adding a non-nut dry ingredient. In reduced-fat peanut spreads, the dry ingredient commonly used is corn syrup solids. These products have a non-fat solids/oil ratio that is about 2:1. Additionally, these products tend to have a low level of peanut solids. In reduced-fat peanut spreads, the amount of peanut paste used is only 60% versus more than 85% in full-fat nut butters. In U.S. Pat. No. 6,010,737, a reduced-fat and reduced-calorie peanut spread is made by using a total non-fat solids/total oil (triglyceride oil plus a low-calorie or no-calorie triacylglcerol oil) ratio ranging from 2.01:1 to about 2.71:1. Like the reduced-fat nut spreads, the level of fat-free nut solids in this application is limited to a maximum level of 34%. To maximize peanut flavor, maximize a soft, spreadable texture and minimize in-process viscosity, a preferred range of 25–29% peanut solids is disclosed. The viscosity of these products is relatively high (6000 to 50,000 cP (centipoise)). Rheologically, the viscosity of peanut butters/spreads is highly influenced by the amount of nut solids in the product, especially when the non-fat solids to total oil ratio exceeds 2. As a result, these products tend to have less peanut flavor and have a less spreadable, less creamy, and stickier texture.

It is desirable to have a non-fat solid/total oil ratio that is closer to that of full-fat nut spreads (about 1:1). Doing so simplifies processing and allows for a product texture that is closer to that of full-fat nut butters. To achieve this ratio, non-digestible fat like polyol fatty acid polyesters have been used. Polyol fatty acid polyesters have the ability to provide fat-like properties but have the advantage of being non-digestible in the human digestive system and hence contribute no calories. Since peanut butter is a viscous suspension, it is desirable to replace the peanut oil with a completely liquid polyol polyester. Unfortunately, regular ingestion of moderate to high levels of completely liquid forms of these polyol polyesters can produce an undesirable oil loss, namely leakage of the polyol polyester through the anal sphincter. In general, control of passive oil loss is achieved by adding an anal leakage control agent such as solid fat to the liquid polyol polyester. For example, see U.S. Pat. Nos. 5,480,667; 5,158,796; 5,194,281; and 5,085,884. In the aforementioned patents, the nature of the anal leakage control agent is such that passive oil loss control is achieved yet the food product has minimized waxiness in the mouth. Waxiness relates to how the fat composition is sensed in the mouth and specifically relates to the sensation of a product having a relatively high level of fat solids.

A method for making reduced-calorie peanut products by replacing peanut oil with polyol fatty acid polyesters is described in U.S. Pat. No. 5,536,524. This disclosure describes only the method but does not describe the actual product properties required to make a good tasting peanut spread. Specifically, it does not teach how to overcome the undesirable effects on peanut flavor and texture caused by replacing peanut oil with a polyol polyesters containing an anti-leakage control agent. Because of the viscous nature of peanut butter, the addition of an agent to prevent leakage results in a very high product viscosity which, in turn, causes a loss of peanut flavor display, loss of spreadability, and an undesirable waxy mouth feel. Thus, a reduced-fat and calorie peanut spread made with a non-caloric fat replacement oil that has good peanut flavor and texture has not been achieved.

SUMMARY OF THE INVENTION

The present invention provides a low-fat and low-calorie nut spread having good nut flavor and texture. The nut spread has at least 50% less fat and 33% fewer calories than full-fat peanut butter, yet has the flavor and texture of a full-fat nut butter or spread. The nut spread has a non-fat solids to total oil ratio that is less than about 2.0:1. The present invention provides a process for making the nut spread. The process comprises the steps of:

(1) providing a nut paste;
(2) defatting a portion of the nut paste to form a defatted nut flour;
(3) milling the defatted nut flour so that the nut solids have a mono-modal particle size distribution to form a mono-modal nut solids flour;
(4) refatting the mono-modal nut solids flour with a non-digestible oil to form a refatted paste mix;
(5) combining a second nut paste portion, nut chunks, or a mixture thereof with the refatted paste mix to form a fluid mix; and
(6) reducing the viscosity of the fluid mix to form the nut spread.

The preferred process for making the nut spread comprises reconstituting nut solids that have a mono-modal particle size distribution where the $D_{50}$ and $D_{90}$ sizes are less than about 15 and about 35 microns, respectively, with oil substitute, followed by blending with peanut paste or peanut chunks. Preferably, the level of fat-free nut solids is from about 34% to about 45%. The apparent viscosity of the nut is less than about 4500 cP. The nut spread comprises at least about 20% oil substitute, preferably olestra that contains an anal leakage controlling agent.

Preferably, the nut solids are finely milled by passing them through a roll refining mill. This reduces the nut solids to a mono-modal particle size distribution. In one embodiment, the nut solids have a mono-modal particle size distribution with a median particle size of about 10 microns or less wherein more than 90% of the particles are less than about 30 microns in size ($D_{90}$ is less than 30 microns). The nut spread is suitable for use as a filling in snack products.

DETAILED DESCRIPTION OF THE INVENTION

A. Definitions

While this invention will be generally described in terms of peanuts and peanut butter, it should be readily apparent that other materials such as almonds, pecans, walnuts, cashews, filberts, macadamia nuts, Brazilians, sunflower seeds, sesame seeds, pumpkin seeds, soybeans, and mixtures thereof could be utilized in this invention. The term "nut" as used herein encompasses these nuts and oil seeds and mixtures thereof.

As used herein, "nut paste" means a suspension of nut solids and oil resulting from the milling of nuts, wherein such milling ruptures the nut oil cells.

As used herein, the term "nut spread" means a spreadable food product made primarily from nut solids and fat/oil, plus other optional ingredients such as nut butter stabilizers, flavorants, flavor enhancers, bulking agents, emulsifiers, and mixtures thereof. Nut spreads include, but are not limited to, "nut butters" and "peanut butters" as defined by the standard of identity of the U.S. Food and Drug Administration.

As used herein, the term "fat" refers to fat and/or oil. While the terms "fat" and "oil" are used somewhat interchangeably, the term "fat" usually refers to triglycerides that are solid or plastic at ambient temperature, while the term "oil" usually refers to triglycerides that are liquid or fluid at ambient temperature.

The term "non-digestible" fat or oil refers to those edible fatty materials that are partially or totally indigestible, e.g., polyol fatty acid polyesters, such as olestra.

As used herein, the term "oil substitute" means a low-calorie, low-fat, non-digestible fat, non-digestible oil, or zero calorie oil such as, but not limited to, sucrose polyesters of long chain fatty acids (olestra) and other polyol polyesters of fatty acids. The preferred olestra is the Olean® brand (available from the Procter & Gamble Company, Cincinnati, Ohio). See, for example, U.S. Pat. No. 3,600,186 to Mattson et al.; U.S. Pat. No. 5,422,131 to Elsen et al.; U.S. Pat. No. 5,419,925 to Seiden et al.; U.S. Pat. No. 5,071,669 to Seiden; and U.S. Pat. No. 4,005,196 to Jandacek. Mixed triglycerides made from medium and long chain saturated and/or unsaturated fatty acids may also be utilized. See, for example, U.S. Pat. No. 5,288,512 to Seiden. Oils that contain medium chain triglycerides can also be used. See, e.g., U.S. Pat. No. 4,863,753 to Hunter et al. Other oils which may be used include a triacylglycerol oil such as liquid Salatrim™ oil (sold under the trade name Benefat™ III by Cultor Food Science, New York, N.Y.). The term "oil substitute" also includes any other suitable liquid non-digestible oils. Liquid non-digestible oils which have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al.; U.S. Pat. No. 3,932,532; issued Jan. 13, 1976); liquid alkyl glycoside fatty acid polyesters (see Meyer et al.; U.S. Pat. No. 4,840,815; issued Jun. 20, 1989); liquid polyesters of two ether linked hydroxypolycarboxylic acids (e.g., citric or isocitric acid) (see Huhn et al.; U.S. Pat. No. 4,888,195; issued Dec. 19, 1988); various liquid esterified alkoxylated polyols including liquid esters of epoxide-extended polyols such as liquid esterified propoxylated glycerins (see White et al.; U.S. Pat. No. 4,861,613; issued Aug. 29, 1989; Cooper et al.; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al.; U.S. Pat. No. 5,077,073); liquid esterified ethoxylated alkyl glycosides (see Ennis et al.; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al.; U.S. Pat. No. 5,374,446; issued Dec. 20, 1994); liquid esterified polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are herein incorporated by reference. Solid non-digestible fats or other solid materials can be added to the liquid non-digestible oils to prevent passive oil loss. Particularly preferred non-digestible fat compositions include those described in U.S. Pat. Nos. 5,490,995, issued to Corrigan; 5,480,667, issued to Corrigan et al.; 5,451,416, issued to Johnston et al.; 5,422,131, issued to Elsen et al. Any other suitable non-digestible oils, reduced-calorie oils, oil substitutes, or mixtures thereof are also included in the term "oil substitute." Mixtures of any of these oils, or mixtures of these oils with glyceride oils are also included by the term.

While this invention will be generally described in terms of olestra, it should be readily apparent that other oil substitutes or mixtures thereof could also be utilized in, and are contemplated by, this invention.

As used herein, the term "defatted" means that some oil or fat has been removed. "Defatted nut solids" means nut solids that have had some of their oil or fat removed.

As used herein, "nut flour" is a flowable solid that is obtained by defatting nut paste by via a mechanical process or a solvent extraction process to make a cake, followed by milling the cake into a granular powder.

As used herein, "nut solids" are the fat-free peanut solids (i.e. nut solids on a fat-free basis).

As used herein "mono-modal" refers to a particle size distribution of solids having essentially a single peak. A "peak" is a local maxima which is at least 2 weight percent units greater than the local minima on either side of the local maxima. As used herein, "multi-modal" or "poly-modal" refers to a particle size distribution curve having multiple peaks.

As used herein, "$D_{90}$" is the diameter of the ninetieth (90th) percentile particles, i.e. 90% of the particles in a sample have a smaller particle size than the size indicated. "$D_{50}$" is defined in a similar manner and represents the fiftieth (50th) percentile particles.

As used herein, all percentages (%) are by weight, unless otherwise indicated.

B. The Nut Spread

The nut spread has at least about 50% less fat and at least about 33% fewer calories than a comparable full-fat nut spread, yet surprisingly has a flavor and a texture comparable to a full-fat nut spread. The process for making the nut spread comprises the steps of:

(1) providing a nut paste;
(2) defatting a portion of the nut paste to form a defatted nut flour;
(3) milling the defatted nut flour so that the nut solids have a mono-modal particle size distribution to form a mono-modal nut solids flour;
(4) refatting the mono-modal nut solids flour with a non-digestible oil to form a refatted paste mix;
(5) combining a second nut paste portion, nut chunks, or a mixture thereof with the refatted paste mix to form a fluid mix; and
(6) reducing the viscosity of the fluid mix to form the nut spread.

1. Providing a Nut Paste

The nut spread of the present invention utilizes a nut paste, preferably peanut paste, as a starting material. While the nut spread will be generally described in terms of peanuts and peanut paste, it should be readily apparent that other materials such as almonds, pecans, walnuts, cashews, filberts, macadamia nuts, Brazilians, sunflower seeds, sesame seeds, pumpkin seeds and soybeans could be used to form the nut paste utilized in the present invention. The term "nut" as used herein encompasses these nuts and seeds. Mixtures of these nuts and oil seeds can also be used.

Roasting of the peanuts prior to defatting is key for the development of the desirable nut flavor. Peanuts are preferably roasted to from about a 32 L' to about a 37 L' roast color, blanched, color sorted, then milled to form a fluid nut paste.

The nut paste can be formed by any of a number of known methods. For example, the nuts can be roasted and then ground in a conventional grinder or mill such as a Bauer mill to produce a nut paste of pumpable consistency.

2. Defatting a First Nut Paste Portion to Form a Defatted Nut Flour

A first nut paste portion is defatted by conventional methods such as solvent extraction or by mechanical expression or the like. Typically, the first nut paste portion is defatted to a fat content of from about 10% to about 30% when a mechanical press is used, and from about 1% to about 33% when a solvent extraction process is employed, to form a defatted nut flour. An example of a mechanical press is a cocoa powder press used in the chocolate industry. Hexane or liquid $CO_2$ are examples of solvent extraction processes. The fat content of the defatted nut flour herein is typically about 20%.

3. Milling the Defatted Nut Flour so that the Nut Solids have a Mono-Modal Particle Size Distribution to Form a Mono-Modal Nut Solids Flour The defatted nut flour is then finely milled such that the nut solids have a mono-modal PSD (particle size distribution), to form the mono-modal nut solids flour. This may be accomplished by any suitable conventional means such as, for example, the method described in U.S. Pat. No. 5,079,027 issued Jan. 7, 1992 to Wong et. al., herein incorporated by reference. Preferably, the defatted nut flour is processed through a roll refining mill. These mills operate with rolls running at different speeds and at a closed gap (i.e., they are touching each other). A sufficient amount of fluid must be in the solids to provide lubrication as the product passes through the rolls. For best results, the total fat content of the defatted nut flour before milling is preferably from about 15% to about 20%. If desired, a suitable amount of non-digestible fat may optionally be mixed with the defatted nut flour prior to milling in order to bring the total fat content into this range.

In one embodiment, the nut solids in the mono-modal nut solids flour have a mono-modal particle size distribution with a $D_{50}$ less than about 15 microns, preferably less than about 10 microns, and more preferably less than about 8 microns; and a $D_{90}$ less than about 35 microns, preferably less than about 30 microns, and more preferably less than about 18 microns.

The benefit of a mono-modal nut solids PSD on reducing nut spread viscosity is reported in U.S. Pat. Nos. 5,709,209; 5,433,970; and 5,693,357. Milling nut solids to a mono-modal PSD allows for the incorporation of a high level of nut solids in the nut spread without incurring a substantial loss of fluidity. Specifically, more than 34% fat-free nut solids can be used. Surprisingly, the use of mono-modal nut solids also results in an enhancement of peanut flavor perception and is one of the key factors that contributes toward the elimination of the waxy mouth feel that is commonly found when olestra is used. The resultant benefit is more nut flavor and reduced ingredient costs.

The nut spread preferably comprises from about 25% to about 75%, preferably from about 35% to about 65%, more preferably from about 40% to about 60%, and still more preferably from about 45% to about 55%, of the mono-modal nut solids flour.

4. Refatting the Mono-Modal Nut Solids Flour with a Non-Digestible Oil to Form a Refatted Paste Mix The mono-modal PSD nut solids flour is then refatted with a non-digestible sucrose polyester oil that contains an anti-leakage agent. To achieve the low-fat content of the nut spread, a portion of the nut oil is replaced by an oil substitute. The preferred oil substitute is olestra. Olestra manufactured by Procter and Gamble contains an anti-anal leakage ingredient. At room temperature, olestra is a semi-solid with a gel-like consistency.

The nut spread comprises at least about 20%, preferably more than about 25%, and most preferably more than about 30%, of oil substitute.

5. Combining a Second Nut Paste Portion, Nut Chunks, or a Mixture thereof with the Refatted Paste Mix to Form a Fluid Mix The refatted paste mix is then combined with a second nut paste portion, nut chunks (i.e. nut granules), or a mixture thereof and mixed to form a fluid mix. Preferably, the ingredients are placed in a mixing vessel that is jacketed and heated to 150° F. The ingredients are mixed for about 10 minutes at a medium speed to form the fluid mix, which is an oil continuous paste. The admixing of nut paste with a refatted paste mix produces a fluid mix with significantly decreased viscosity and increased nut flavor.

Preferably, the nut spread comprises at least about 5% of a second nut paste portion, preferably from about 5% to about 25%. Preferably, the nut spread comprises at least about 5% nut chunks, preferably from about 5% to about 25%. A mixture of at least about 5% nut paste and nut chunks, preferably from about 5% to about 25%, can also be used.

6. Reducing the Viscosity of the Fluid Mix to Form the Nut Spread

The fluid mix is then sheared to increase the nut flavor and to lower the apparent viscosity to less than about 4500 cP, preferably less than about 4000 cP, and most preferably less than about 3000 cP, measured at 150° F. (65.6° C.) and 6.8 sec$^{-1}$. It was found that reducing the viscosity to such a level is important in achieving a nut spread having a taste that is organoleptically comparable to full-fat nut spreads.

7. Optional Ingredients

The nut spread can comprise from about 0% to about 20% optional ingredients, preferably from about 0% to about 15% optional ingredients. Optional ingredients can be added at or after any suitable step of the nut spread making process.

Especially preferred are particulate water soluble solids such as flavorants, flavor enhancers, bulking agents, and mixtures thereof. Without being limited by theory, it is believed that the inclusion of particulate water soluble solids results in a rapid hydration of the nut solids. Consequentially, the peanut flavor release is enhanced and the faster in-mouth dissolution of the water soluble solids helps disperse and/or emulsify the non-digestible oil, which helps reduce waxy mouthfeel.

As used herein, "flavorants" refer to agents that contribute to the flavor of the nut spread. These include sweeteners, natural and artificial flavors, and other flavorants that contribute to the flavor of the nut spread, including natural or artificial peanut flavors, roasted flavors, praline/caramel flavors, walnut flavors, almond flavors and flavor compositions. Sweeteners can be selected from sugars, sugar mixtures, artificial sweeteners and other naturally sweet materials. Sugars include, for example, sucrose, fructose, dextrose, honey, high fructose corn syrup, lactose, maltose, and maltose syrups. Preferably, the sweetener will have a sweetness intensity the same or similar to that of sucrose or fructose. Sugars are typically included the nut spreads of the present invention at a level of from about 0.5 to about 10%, preferably from about 1 to about 7%.

Artificial sweeteners such as aspartame, acesulfam, saccharine, cyclamate and glycerrhizin can also be used in the nut spreads of the present invention. The amount of artificial sweetener used depends on its sweetness intensity. Typically, these artificial sweeteners are included in amount that provides a sweetness intensity equivalent to the addition of from about 0.5 to about 10%, preferably from about 1% to about 7%, sucrose. Usually from about 0.001% to about 2% artificial sweetener is used.

As used herein, "flavor enhancers" refer to agents that enhance or complement the flavor of the nut spread. Flavor enhancers include salt or salt substitutes such as sodium chloride, potassium chloride, sodium chloride/potassium chloride mixtures, and seasoned salts. The level of flavor enhancer used is a matter of the desired taste level, but usually is from about 0.1 to about 2%, preferably from about 0.5 to about 1.5%, of the nut spread.

The nut spreads of the present invention can also comprise from about 0.01% to about 0.02% citric acid as a flavor enhancer. Preferably from about 0.01% to 0.015% citric acid is used. The addition of citric acid can enhance the roasted nut and especially the roasted peanut butter flavor and saltiness impression, thereby reducing the amount of salt required to give the nuts spreads, especially peanut butters, of the present invention an acceptable flavor. The addition of citric acid, especially in the presence of a metallic ion salt, also allows the nut spread to achieve oxidative stability through chelation of the metal ions by the citric acid.

Particularly preferred flavor systems for use in the nut spreads of the present invention are those involving a combination of sugar and salt. For nut spreads using this preferred flavor system, the sugar is typically present in the spread at a level from about 0.5 to about 10%, preferably from about 1 to about 7%; the level of salt is typically present in the spread at a level of from about 0.1 to about 2%, preferably from about 1 to about 1.5%.

Particulate water soluble bulking agents can be used in the nut spreads of the present invention. These bulking agents typically add body or texture to the spread and can be non-nutritive or low-calorie materials. Suitable bulking agents include corn syrup solids, maltodextrin, dextrose, polydextrose, mono- and disaccharides, starches (e.g., corn, potato, tapioca wheat), as well as mixtures of these agents. Corn syrup solids, polydextrose (from Pfizer Chemicals) and maltodextrin are preferred bulking agents. Sugar substitutes which function like sugars but which are non-nutritive can also be used herein. Such sugar substitutes include the 5-C-hydroxyalkylaldohexoses described in U.S. Pat. No. 5,041,541, issued to Mazur.

In order to minimize grittiness, these particulate water soluble solids preferably have a relatively fine particle size. Particulate water soluble solids included in the nut spreads of the present invention preferably have a mean particle size of about 20 microns or less. Especially preferred particulate water soluble solids have a mean particle size of about 10 microns or less.

Any other suitable optional ingredients may also be used in the nut spread of the present invention.

The nut spread of the present invention may optionally contain a stabilizer. The stabilizer can be any of the known peanut butter stabilizers such as, but not limited to, hydrogenated rapeseed oil or other hydrogenated triglycerides having a high proportion of $C_{20}$ and $C_{22}$ fatty acids. (See, for example, U.S. Pat. No. 3,597,230 and U.S. Pat. No. 3,192,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, cottonseed oil, coconut oil, and similar materials. This stabilizer can also be mixed with lower melting fat fractions such as, for example, the peanut butter stabilizer composition disclosed in U.S. Pat. No. 4,341,814.

In addition to the stabilizer, or in lieu thereof, an emulsifier can be used in the present invention. The emulsifier can be any food compatible emulsifier such as mono-and di-glycerides, lecithin, sucrose monoesters, polyglycerol esters ("PGE"), sorbitan esters, polyethoxylated glycerols, and mixtures thereof. Typically, from about 0% to about 3%, preferably from about 1% to about 3%, stabilizer or emulsifier or a mixture thereof is preferably used.

The present invention can also employ other flavored additives which can be mixed with the nut spread. These additives include nut chunks, chocolate chips or bits or other flavored bits (e.g., butterscotch and peanuts), jellies (either low-calorie jellies or regular jelly or preserves), and praline nuts or other candies. These additives are usually added at a level of from about 1% to about 20% by weight. Nut chunks and flavored bits can contain fats and oils. Thus, the addition of these materials can affect the fat content and the calorie level of the nut spread.

Preferred nut chunks can be prepared by milling roasted peanuts. In one embodiment the roasted peanuts are chopped and sized between a No. 7 and No. 20 U.S. Standard sized screen. Use of peanut chunks in this size range is desirable in the making of a low-fat peanut spread.

The nut spread can also be fortified with vitamins and/or minerals. These can include, but are not limited to, Vitamin C, Vitamin E, thiamin, riboflavin, niacin, Vitamin B-6, Vitamin B-12, biotin, pantothenic acid, iron, calcium, niacin, magnesium, and mixtures thereof.

Sterols or sterol esters can also be incorporated into the nut spread of the present invention. Preferably, the nut spread contains about 1.8 grams of sterol or sterol ester per serving. Suitable sterol and sterol ester compositions are described in U.S. Pat. No. 3,751,569, issued Aug. 7, 1973 to Erickson; U.S. Pat. No. 5,244,887, issued Sep. 14, 1993 to Straub; U.S. Pat. No. 3,865,939 issued Feb. 11, 1975 to Jandacek et al.; U.S. Pat. No. 3,085,939, issued Apr. 16, 1963 to Wruble; U.S. Pat. No. 5,502,045, issued Mar. 26, 1996 to Miettinen; U.S. Pat. No. 5,958,913, issued Sep. 28, 1999 to Miettinen; and U.S. patent application Ser. No. 09/812,532, entitled "Sterol Ester Compositions," filed Mar. 20, 2001, in the name of Wong et al.

8. Nut Spread Properties

The preferred nut spread has a non-fat solids to total oil ratio of less than 2.0:1, preferably less than 1.5:1. The nut spread has at least about 50% less fat and at least about 33% fewer calories than comparable full-fat nut spreads.

The nut spread of the present invention preferably comprises from about 25% to about 45%, preferably from about 35% to about 40%, nut solids (on a defatted basis).

For the desired flavor and protein content, the fat-free nut solids typically comprise from about 25% to about 45%, preferably from about 35% to about 45%, and more preferably from about 35% to about 40% of the nut spread. The source of the nut solids can include, for example, the combination of full-fat peanut paste, full-fat peanuts, defatted peanuts, defatted peanut flour, and the like.

Olestra is typically more viscous than the nut oil that it replaces because of the addition of the anti-anal leakage ingredient. At ambient temperature, the apparent viscosity of olestra measured at 6.8 sec$^{-1}$ is typically about 4350 cP vs. about 50 cP for peanut oil. Because of its gel-like state, using this oil as a peanut oil replacement causes a waxy mouth feel and a suppression of the nut flavor. This effect is most pronounced in nut spreads where the level of peanut solids exceeds 45% and the ratio of non-fat solids to total oil exceeds 2.0:1.

The addition of anti-anal leakage ingredient at a level high enough to prevent anal leakage typically tastes waxy in the mouth when ingested. This effect can occur when Olean® (A commercially available sucrose polyester manufactured by Procter & Gamble that contains an anti-anal leakage agent) is used to replace the nut oil in order to make low-fat and calorie nut spreads. The resultant nut spreads have a waxy mouth feel, high stickiness perception and a loss of peanut flavor. The present invention overcomes these problems.

Surprisingly, the use of mono-modal nut solids also results in an enhancement of peanut flavor perception and is one of the key factors that contributes toward the elimination of the waxy mouth feel that is commonly found when olestra is used. The resultant benefit is more nut flavor and reduced waxy mouth feel.

Surprisingly, increasing the level of nut solids beyond the level in full nut spreads (about 45%) does not result in an increase in peanut flavor. Instead, such products have less peanut flavor as well as an undesirable waxy mouth feel. Without being bound by theory, it is believed that the rheology of nut spreads is highly impacted by the level and size distribution of the nut solids. When a high level of nut solids is present, the viscosity of the mix becomes excessively high; this decreases the extent of hydration of the nut solids during mastication. It is believed that peanut flavor volatiles are released when the nut solids are hydrated. Poor mixing in the mouth due to the high viscosity can also lead to poor heat transfer, resulting in a higher level of solid fat and a waxy eating quality.

ANALYTICAL TEST METHODS

A number of parameters used to characterize elements of the present invention are quantified by particular analytical methods. These methods are described in detail as follows. (All laboratory instruments should be operated according to manufacturers' instructions, as set forth in the instrument operation manuals and/or other instructional materials, unless otherwise indicated.)

1. Particle Size Analysis

A Malvern 2600D particle size analyzer with a PS/2 computer is used to analyze the particle size of the samples. A small amount (about 0.01 grams) of sample is placed in a 25 ml test tube and about 15 ml of acetone are added to it. The sample is dispersed in the acetone by using a vortex mixer. A transfer pipette is then used to add this diluted solution dropwise to the acetone filled cell of the analyzer. The sample is added until the obscuration is 0.2 to 0.3. The obscuration refers to the amount of light which is obscured by the sample because of diffraction and absorption. The instrument reads more accurately when the obscuration is 0.05 to 0.5 and preferably from 0.2 to 0.3 (20% to 30% of the light energy is reduced).

The apparatus is fitted with a 100 mm lens to determine the particle size of the paste. Particle sizes from 0.5 to 188 microns can be measured using a 100 mm lens. A magnetic stirrer is used to insure that the sample is being dispersed during the readings. Each sample is swept 250 times by the laser for each reading. Each sample was read a minimum of three times with a five (5) minute wait between each reading.

2. Viscosity Method

Casson Plastic Viscosity and Casson Yield Value and Nut Spread

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. and all samples are measured at 65° C.

A sample of 14.0 grams of nut spread (non-aerated) is placed in the sample cell. The sample cell is then inserted in the jacketed cell holder. To compensate for heat losses through the tubings, etc., the water temperature entering the jacketed cell holder should be a few degrees higher than the desired sample temperature of 65° C. After the temperature of the sample has reached 65° C. the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE I

| Time Before Reading (Sec) | RPM |
|---|---|
| 3 | 100 |
| 6 | 50 |
| 15 | 20 |
| 30 | 10 |
| 60 | 5 |

The dial reading and rpm are converted into shear stress and shear rate values by multiplying the rpm and dial reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the nut spread's viscosity at an infinite shear rate. It accurately predicts the resistance to flow in pumping, moving or mixing situations. The Casson plastic viscosity is measured in poise.

The second value is the yield value which is equal to the value of the x intercept (abscissa) squared. The yield value is a measure of amount of force or shear that is necessary to get the nut spread to start moving. The yield value is measured in dynes per square centimeter. The relationship between the plastic viscosity and the yield value determine how a nut spread will behave in additional processing.

3. Fat

Digestible Fat and Saturated Fat: The content of total digestible fat and total digestible saturated fat of a food is measured according to the published AOAC peer-verified method for quantifying fat in olestra-containing snack foods (AOAC Peer-Verified Method PVM 4:1995, "Capillary Gas Chromatographic Determination of Fat in Olestra Savory Snack Products," AOAC International, Gaithersburg, Md.).

EXAMPLES

The following examples are illustrative of the present invention but are not meant to be limiting thereof.

Example 1

Example 1 describes a reduced-fat peanut spread made with Olean® brand olestra. Peanut paste milled to a bi-modal PSD is used in the mix. The nut spread has 68% less fat and 43% fewer calories than conventional full-fat peanut butter.

| Ingredients | Ingredient wt. % | wt. % Total Fat |
|---|---|---|
| Defatted peanut flour @ 18.5% fat | 39.00 | 7.22 |
| Peanut Paste | 14.84 | 6.09 |
| 12X Sucrose | 15 | |
| Salt | 1.00 | |
| Stabilizer | 2.66 | 2.66 |
| Olean ® | 27.50 | |
| Total | 100 | 15.97 |

The defatted peanut flour is passed through a 4-roll refining mill. This mills the nut solids to a mono-modal particle size distribution. The roll-milled peanut flour is then mixed with the peanut paste, Olean®, salt and stabilizer in a heated Hobart bowl. The temperature of the mix is 150° F. The mix is then transformed into a fluid mass within 10 minutes of mixing at moderate speed.

The nut spread has a fat content of 15.97% and contains only 330 calories. The nut spread has 40.5% fat-free nut solids. The fat and calorie reduction compared to full-fat nut butters are 68% and 43%, respectively. The ratio of non-fat solids to total oil is 1.3:1. The apparent viscosity of the nut spread is 4213 cP. The nut spread has comparable flavor and texture to fall-fat nut butters.

Example 2

Example 2 demonstrates another way of making a reduced-fat and calorie nut spread. In this method, a 1% fat peanut flour is used. Using this low-fat peanut flour allows for a high level of peanut paste for more peanut flavor.

| Ingredients | Ingredient wt. % | Total Fat |
|---|---|---|
| Defatted peanut flour @ 1% fat | 26.00 | 0.26 |
| Peanut Paste | 27.84 | 12.59 |
| 12X Sucrose | 15 | |
| Salt | 1.00 | |
| Stabilizer | 2.66 | 2.66 |
| Olean ® | 27.50 | |
| Total | 100 | 15.51 |

The 1% fat peanut flour is mixed with Olean® to make a mix that has 20% total oil (peanut oil and Olean®). This is made by combining 80.81% peanut flour with 19.19% Olean®. The mix is then passed through a 4-roll refining mill to form a roll-milled mix. This mills the nut solids to a mono-modal particle size distribution. The roll-milled peanut flour is then mixed with the peanut paste, Olean®, salt and stabilizer in a heated Hobart bowl. The composition of this mix is shown in the table below. The temperature of the mix is 150° F. The mix is then transformed into a fluid mass within 10 minutes of mixing at medium speed.

| Ingredients | % by wt |
|---|---|
| Roll-milled mix | 40.93 |
| Olean ® | 12.57 |
| Sugar | 15.00 |
| Salt | 1.00 |
| peanut paste | 30.50 |

The nut spread has a fat content of 15.51% and contains only 330 calories. The nut spread contains 41% fat-free nut solids. The fat and caloric reduction compared to fill-fat nut butters are 68% and 43%, respectively. The ratio of non-fat solids to total oil is 1.3:1. The apparent viscosity of the nut spread is 4373 cP and the flavor and texture of the spread are equivalent to fall-fat nut butters.

Example 3

Example 3 is a low-fat nut spread made with Olean®. A paste mix is formed and then combined with peanut granules sized between a no. 7 and no. 20 U.S. standard screen. The finished nut spread composition comprises 79% paste mix and 21% peanut granules.

The paste mix has an apparent viscosity of 2125 cP. The ratio of the non-fat solids to total oil is 0.91:1.

| | Paste mix Composition | |
|---|---|---|
| Ingredients | Ingredient wt. % | Total Fat |
| Defatted peanut flour @ 18.5% fat | 43.04 | 7.96 |
| Olean ® | 41.64 | |
| 12X Sucrose | 11.39 | |

-continued

Paste mix Composition

| Ingredients | Ingredient wt. % | Total Fat |
|---|---|---|
| Salt | 1.27 | |
| Stabilizer (hydrogenated soybean and rapeseed mix) | 2.66 | 2.66 |
| Total | 100 | 10.62 |

The nut spread has good peanut flavor and texture. It has 62% and 44% less fat and calories, respectively, than full-fat nut butters. The peanut spread is suitable for use as a filling for snacks such as peanut butter crackers.

INCORPORATED BY REFERENCE

All of the aforementioned patents, publications, and other references are herein incorporated by reference in their entirety.

In addition, the following are herein incorporated by reference in their entirety: U.S. Pat. No. 5,942,275 issued Aug. 24, 1999, to Wong et al.; U.S. Pat. No. 5,885,646, issued Mar. 23, 1999 to Wong et al.; U.S. Pat. No. 5,885,645, issued Mar. 23, 1999 to Wong et al.; U.S. Pat. No. 5,714,193 issued Feb. 3, 1998 to Fix et al.; U.S. Pat. No. 5,693,357 issued Dec. 2, 1997 to Wong et al.; U.S. Pat. No. 5,667,838 issued Sep. 16, 1997 to Wong et al.; U.S. Pat. No. 5,518,755 issued May 21, 1996 to Wong et al.; U.S. Pat. No. 5,508,057 issued Apr. 16, 1996 to Wong et al.; U.S. Pat. No. 5,490,999, issued Feb. 13, 1996 to Villagran et al.; U.S. Pat. No. 5,433,970 issued Jul. 18, 1995 to Wong et al.; U.S. Pat. No. 5,230,919 issued Jul. 27, 1993 to Walling et al.; U.S. Pat. No. 5,079,027, issued Jan. 7, 1992 to Wong et al.; U.S. Pat. No. 3,265,507, issued Aug. 9, 1966 to Japikse; U.S. Pat. No. 3,129,102 to Sanders; U.S. Pat. No. 1,395,934 issued Nov. 1, 1921 to Stockton; U.S. Pat. No. 2,504,620 issued Apr. 18, 1950 to Avera; U.S. Pat. No. 2,521,243 issued Sep. 5, 1950 to Mitchell; U.S. Pat. No. 2,562,630 issued Jul. 31, 1951 to Mitchell; U.S. Pat. No. 2,552,925 issued May 15, 1951 to Avera; U.S. Pat. No. 6,010,737 issued Jan. 4, 2000 to Meade; co-pending U.S. application Ser. No. 09/511,058 filed Feb. 23, 2000 by Wong et al. entitled "Peanut Butter with Improved Flavor and Texture"; and co-pending U.S. Provisional Application Serial No. 60/192,813 filed Mar. 29, 2000 by Wong et al. entitled "Low Fat Nut Spread Composition with High Protein and Fiber."

Also incorporated herein by reference are U.S. patent application Ser. No. 60/242,609 ("Reduced Fat Lipid-Based Fillings," Trout et al.), 60/242,608 ("Low Moisture, Reduced Fat, Lipid-Based Fillings," Trout et al.), 60/242,607 ("Reduced Saturated Fat Lipid-Based Fillings," Trout et al.), and 60/242,460 ("Filled Snacks," Heisey et al.), all filed Oct. 23, 2000.

What is claimed:

1. A process for making a nut spread, comprising the steps of:
   (a) providing a nut paste;
   (b) defatting a portion of the nut paste to form a defatted nut flour;
   (c) milling the defatted nut flour so that the nut solids have a mono-modal particle size distribution to form a mono-modal nut solids flour;
   (d) refatting the mono-modal nut solids flour with a non-digestible oil to form a refatted paste mix;
   (e) combining a second nut paste portion, nut chunks, or a mixture thereof with the refatted paste mix to form a fluid mix; and
   (f) reducing the viscosity of the fluid mix to form the nut spread.

2. The process of claim 1, wherein the nut spread of step (f) has a non-fat solids to total oil ratio of less than about 2.0:1.

3. The process of claim 2, wherein the nut spread has an apparent viscosity of less than about 4500 cP.

4. The process of claim 3, wherein the level of fat-free nut solids in the nut spread is from about 34% to about 45%.

5. The process of claim 4, wherein the nut solids of step (c) have a $D_{50}$ of less than about 15 microns and a $D_{90}$ of less than about 30 microns.

6. The process of claim 5, wherein the nut spread comprises at least about 20% oil substitute.

7. The process of claim 6, wherein said oil substitute comprises olestra.

* * * * *